(12) United States Patent
Scholz et al.

(10) Patent No.: US 8,486,158 B2
(45) Date of Patent: Jul. 16, 2013

(54) METHOD AND DEVICE FOR CONTINUOUSLY PRODUCING A CRYSTALLITE HAVING A CONSTANT PARTICLE SIZE DISTRIBUTION

(75) Inventors: Reinhard Scholz, Kerken (DE); Günter Hofmann, Duisburg (DE)

(73) Assignee: GEA Messo GmbH, Duisburg (DE)

( * ) Notice: Subject to any disclaimer, the term of this patent is extended or adjusted under 35 U.S.C. 154(b) by 337 days.

(21) Appl. No.: 12/993,694

(22) PCT Filed: Jun. 10, 2009

(86) PCT No.: PCT/EP2009/057167
§ 371 (c)(1),
(2), (4) Date: Nov. 19, 2010

(87) PCT Pub. No.: WO2009/153199
PCT Pub. Date: Dec. 23, 2009

(65) Prior Publication Data
US 2011/0061205 A1     Mar. 17, 2011

(30) Foreign Application Priority Data
Jun. 18, 2008 (DE) .......................... 10 2008 029 050

(51) Int. Cl.
*B01D 9/00* (2006.01)
(52) U.S. Cl.
USPC ........................................ 23/299; 422/245.1
(58) Field of Classification Search
USPC .................. 23/299, 300, 301; 422/245.1, 608
See application file for complete search history.

(56) References Cited

U.S. PATENT DOCUMENTS

| | | | |
|---|---|---|---|
| 3,628,919 A | 12/1971 | Beauchamp | |
| 3,900,292 A | 8/1975 | Fairchild | |
| 4,164,429 A | 8/1979 | Mercier | |

FOREIGN PATENT DOCUMENTS

| | | |
|---|---|---|
| EP | 0632738 B1 | 11/1995 |
| JP | 2005194153 A | 7/2005 |
| WO | 0056416 A1 | 9/2000 |

OTHER PUBLICATIONS

International Search Report and Written Opinion of the International Searching Authority from corresponding Patent Cooperation Treaty (PCT) Application No. PCT/EP2009/057167, mailed Oct. 7, 2009.
Commonly assigned co-pending U.S. Appl. No. 12/863,661, filed Jul. 20, 2010.
International Preliminary Report on Patentability from corresponding Patent Cooperation Treaty Patent Application No. PCT/EP2009/057167 mailed Jan. 18, 2011.

*Primary Examiner* — Edward Johnson
(74) *Attorney, Agent, or Firm* — Gardner, Linn, Burkhart & Flory, LLP

(57) ABSTRACT

The invention proposes a method and a device for continuously producing a crystallite, wherein a metered amount of seed crystals is fed continuously to the internal solution circuit of a crystallizer, in particular a DTB crystallizer, through a crystallization seed line from a seed generator preferably designed as a flash crystallizer. The amount of seed crystals fed is controlled by an electronic control system as a function of a measured value determined by a sensor, said value being representative of the particle size distribution of the crystallites in the solution in the internal circuit in the crystallizer. By way of a line, the seed generator receives a partial stream of the external solution circuit of the crystallizer, said external circuit being routed through a line. Excess fine crystalline suspension can be fed back to the external circuit from the seed generator by way of a return line.

27 Claims, 2 Drawing Sheets

METHOD AND DEVICE FOR CONTINUOUSLY PRODUCING A CRYSTALLITE HAVING A CONSTANT PARTICLE SIZE DISTRIBUTION

CROSS REFERENCE TO RELATED APPLICATION

The present application claims the priority benefits of International Patent Application No. PCT/EP2009/057167, filed on Jun. 10, 2009, which is hereby incorporated herein by reference in its entirety.

BACKGROUND OF THE INVENTION

The invention relates to a method for continuously producing a product crystallizate, also known as a crystallite or crystallization substance, having a substantially constant particle size distribution and to a system for carrying out this method.

A series of crystallizates, such as ammonium sulphate $((NH_4)_2SO_4)$ which is mainly used as fertilizer in agriculture to provide nitrogen and sulphur must be produced where possible in a medium or large particle size, thus avoiding fine crystallizate having, e.g., a particle size of less than 1 mm. The relative coarseness ensures effective distribution and, when mixed with other fertilizers, suppresses a tendency towards demixing which would be aggravated by fines in a particle mixture.

Coarse-particle crystallizates can be produced from solutions in DTB (Draft Tube Baffled) or Oslo-type crystallizers. A DTB crystallizer uses internal circulation with conveyance of the crystal suspension through a flow guide tube, and an internal clarification zone which is separated by a separating plate from the internally circulated suspension zone. At the top of the calmed clarification zone, in which only a low entrainment rate prevails, a suspension containing only fine crystals is drawn off, since the sinking rate of crystals having a diameter above the separation particle as per design is greater than the entrainment rate in the clarification zone. Large crystals thus remain in the homogeneously mixed suspension zone of the DTB crystallizer.

The same also applies to the crystallization space of an Oslo crystallizer which likewise comprises a clarification zone. In both cases, the overflow of the clarification zone is drawn off by an external circulation pump, is mixed many times with an undersaturated feed solution, but in particular is overheated, e.g., in a heat exchanger. Fine crystals contained in the overflow of the clarification zone are completely dissolved by the admixture of undersaturated solution and primarily by the increase in solubility as a result of the elevation in temperature. The overheated, externally circulated solution is guided at the lower end or below the flow guide tube back into the DTB crystallizer and is conveyed by the internal circulation, which is greater in quantitative terms, through the flow guide tube to the phase boundary surface of the crystallizer where by reason of the ongoing overheating, solvent is evaporated and consequently the solution becomes oversaturated. With a sufficiently large internal circulation, the extent of oversaturation can essentially be maintained within the metastable range, so that no spontaneous seed generation occurs and the oversaturation decreases exclusively in the coarse crystals present. Since the internal circulation pump can be operated at a low screw rotational speed, the conveyance effected serves to conserve particles and promotes the formation of a coarse-particle product crystallizate in a DTB crystallizer. Nevertheless, small crystals produced by the comminution of particles are continuously drawn off via the clarification zone and dissolved.

EP 0632738 B1 discloses a continuous crystallization method, in which a coarse-particle ammonium sulphate crystallizate can be produced from an oversaturated, aqueous ammonium sulphate solution in a DTB crystallizer. In this method, a suspension consisting of oversaturated ammonium sulphate solution and already formed crystallizate is continuously circulated within the DTB crystallizer in an internal circuit. Evaporation of the solvent (water) continuously creates new oversaturation which is then reduced by reason of the crystallization which occurs. The vapour resulting from the evaporation is drawn off at the head of the DTB crystallizer. From a part which is separated from the internal circuit of the suspension by means of flow guide walls in the upper region of the crystallization space of the DTB crystallizer and in which in contrast to the base region of the crystallizer a clarified solution is present having a solids proportion consisting substantially of seed crystals and fine crystals, a partial flow of clarified solution is drawn off and, after dissolution of the solids proportion contained therein, is guided back into the base region of the crystallization space.

In order to dissolve the solids proportion, a heat exchanger which increases the temperature of the clarified solution and thus the power of the solvent to dissolve ammonium sulphate is incorporated into the external circuit. Moreover, the supply line, through which the new concentrated ammonium sulphate solution can be fed into the crystallizer also issues into the external circuit upstream of the heat exchanger. A partial flow of suspension with the proportion of solids contained therein at the desired particle size of the product crystallizate is continuously drawn off from the base region. The product crystallizate is separated from the mother solution in a thickener and by subsequent centrifugation and the mother solution is then guided back into the DTB crystallizer. In order to increase the generation of a sufficiently coarse-particle crystallizate and improve production with regard to the cyclical fluctuations in particle size, in this method in addition to supplying saturated ammonium sulphate solution, a crystallizate suspension consisting of ammonium sulphate is fed at a constant admission rate from an external source into the crystallizer.

EP 0632738 B1 does not contain any references to the manner in which the suspension is produced, i.e. whether it has been produced by the dissolution of comminuted product crystallizate or in a separate crystallizer. It is merely specified that this suspension must satisfy specific conditions:

The temperature of the suspension fed in must not exceed the operating temperature in the crystallizer. Moreover, the suspension must contain 6-24% by volume of crystallizate, wherein at least 35% of the crystals are larger than 1.2 mm, and the infeed of the suspension is to be of such a rate that the weight of the crystals in the suspension fed in is in the range of 4-25% of the weight of the crystals in the suspension having the product crystallizate, which suspension is drawn off from the base region of the crystallizer.

This targeted infeed of crystal suspension into a crystallizer to influence the particle size is also defined as seeding.

WO 00/56416 discloses a method for controlling the particle size in the case of continuous mass crystallization, which method is also provided for the generation of coarse-particle ammonium sulphate crystallizate in an Oslo crystallizer or DTB crystallizer and in which in a similar manner to the method in accordance with EP 0632738 B1 seeding is effected with a crystal suspension supplied externally. The seeding product is a crystallizate which in its parameters is produced independently of the current crystallization process and which has an average particle diameter of 0.1-1.0 mm. In this method, the temperature of the seeding product during the addition must also not exceed the operating temperature in the crystallizer, but must be up to 40° C., preferably 10-30° C., lower. All other infeeds and recirculations are free of solids. In specific terms, this means that the feedstock for the generation of the ammonium sulphate product crystallizate is supplied as a preheated solids-free ammonium sulphate feed solution, and that the external circuit consisting of drawn-off solution with a fine solids proportion leads out of the crystallizer initially to a heat exchanger which by elevating the temperature of the solution causes the solids proportion to re-dissolve, before the solids-free solution is then guided back into the crystallizer. The heat energy for heating the heat exchanger is provided by means of the vapour which is drawn off from the crystallizer and which initially is brought to a higher temperature level by vapour compression.

From the base region of the crystallizer, a suspension having a solids proportion at the desired particle size is continuously drawn off and separated by centrifugation into product crystallizate and mother solution, wherein the mother solution is conveyed into an intermediate container from where it is fed back into the circulation line of the external circuit of the crystallizer. The seeding product is added preferably in an amount, of which the solids proportion amounts to 5-30% by weight of the solids discharged in each case from the crystallizer. The solids proportion of the seeding product can be generated, e.g., by mechanically comminuting some of the product crystallizate and/or by means of a separate crystallization stage.

Finally, JP 2005-194153 A discloses a system, which is designed as a DTB crystallizer, for producing ammonium sulphate crystallizate, in which an external circuit for clarified solution is provided, which circuit is connected to a clarification zone of the crystallizer and into which a heat exchanger or a supply line for solvents (e.g., water or undersaturated ammonium sulphate solution) is optionally incorporated for the purpose of dissolving the contained solids proportion. Moreover, the clarification zone is connected directly or indirectly via the external circuit to a further extraction line, by means of which a suspension which contains only fine crystallizate as solids can be completely locked out of the process, in order to obtain, e.g., fine-particle ammonium sulphate product. Furthermore, the uppermost part of the clarification zone has a third extraction line connected to it, through which an excess of seed crystals and very fine crystallizate can be drawn off and guided into a collecting container where required. In order to dissolve the solids, solvent is introduced into the collecting container, from where the solution obtained is guided into a neutralization container, in which sulphuric acid and ammonia are added to the solution and the solution is heated by the neutralization reaction associated therewith. The heated solution is then fed into the crystallizer.

SUMMARY OF THE INVENTION

Both the DTB crystallizer and the Oslo crystallizer encounter the problem that the average particle size of the product crystallizate produced in the crystallizer is subjected to cyclical fluctuations, i.e., phases having a high coarse-particle proportion alternate with phases, in which predominantly fine-particle crystallizate accumulates. The present invention is based upon a recognition that the size of the crystals formed initially increases continuously, since by reason of the extraction of fine particles through the outer solution circuit of the crystallizer, only the crystals which become increasingly larger are available for reducing the oversaturation. The rate of reduction of oversaturation in the crystals is as a first approximation proportional to the product of diffusion rate and available crystal surface. Since the specific surface of the crystal stock becomes smaller in the crystallizer as the grain becomes increasingly larger, the oversaturation must become continuously greater in order to achieve the production output predetermined by evaporation. If the oversaturation then exceeds the metastable range, spontaneous seed generation suddenly occurs yielding an immense number of fine crystals. Although the fine crystals are for the most part dissolved in the external circuit, a proportion thereof still remains in the internal circulation circuit and grows up to the particle size which is no longer discharged via the clarification zone, but initially is considerably smaller than the particle size sought for the product. Over time, these crystals then grow to the desired particle size. After a further increase in the particle size, spontaneous seed generation then occurs, i.e., the cycle starts afresh.

The present invention improves upon a generic method in such a way as to ensure crystallization of a substance consisting of an oversaturated solution in medium to coarse particle size whilst maintaining the most constant possible particle size distribution over time and with the lowest possible equipment outlay. Moreover, a system is to be provided for carrying out the method.

A method for continuously producing a product crystallizate having a substantially constant particle size distribution by the crystallization of a substance consisting of an oversaturated solution of the substance in a solvent in a crystallization stage, according to an aspect of the invention, including a suspension of oversaturated solution and crystallizate formed in the crystallization stage being circulated internally, wherein the oversaturation of the solution is produced by evaporation of the solvent in the crystallization stage and the vapour thus formed is drawn off from the crystallization stage, wherein furthermore from a clarification region of the crystallization stage, in which in contrast to the base region thereof a clarified solution is present having a solids proportion consisting substantially of seed crystals and fine crystals, a partial flow is drawn off, is heated in an external circuit and, after dissolution of the solids proportion, is then guided as a solution back into the crystallization stage. The crystallization stage is continuously supplied with fresh solution and a crystal suspension, wherein a product suspension having the proportion of product crystallizate, contained therein, at the desired particle size is continuously drawn off from the base region of the crystallization stage.

In accordance with this aspect of the invention, it is provided that as the seed suspension is continuously fed from a seed generation stage into the internally circulated suspension, the amount of seed suspension fed in is metered in dependence upon a measured value. The measured value may be determined continuously or at time intervals and is representative of the particle size distribution in the suspension of the crystallization stage. The seed suspension may consist of solution and seed crystals and very fine crystallizate of the substance (average particle size d' preferably less than 0.1 mm).

The measured value can be determined directly by a corresponding measurement of the suspension in the crystallization space or even indirectly, e.g., by measuring the product crystallizate produced and drawn off. A manual determination is fundamentally also possible. An automatic electronic determination may also be used.

The product crystallizate can be obtained in a known manner by separating the product crystallizate from the mother solution and the mother solution can be guided back into the crystallization stage; in so doing the crystallizate is typically also washed, dried and optionally screened. However, these last referred to steps do not form part of the subject matter of the invention.

Embodiments of the present invention render it possible by simple and reliable measures to purposefully obviate a temporary lack of seed crystals in the crystallization space which would lead to cyclical fluctuations in the particle size distribution. This lack of seed crystals is brought about by the fundamentally overly effective dissolution of solids as a result of the occurring temperature elevation of the solution in the external circuit of a DTB crystallizer or in the external circulation of an Oslo crystallizer which functions in the same manner as this external circuit. As long as a comparably fine-particle crystallizate prevails in the crystallization space, this radical seed crystal elimination is innocuous, as the fine crystallizate offers sufficient crystallization surface to be able to reduce the oversaturation of the solution, which is continuously renewed by solvent evaporation, by means of crystal growth in the internal solution circulation. The internal solution circulation is effected in the DTB crystallizer by a dedicated internal circulation pump and is effected in the Oslo crystallizer by the geodetic height difference which exists between the evaporation space of the externally heated solution which is fed back, and the actual crystallization space.

Although the introduction of seed crystals at a practically constant concentration into the crystallization space as targeted in accordance with an embodiment of the invention ensures that most of these seed crystals are then discharged via the clarification zone of the crystallization space into the external circulation and eliminated, a portion thereof always remains in the crystallization space and grows to a crystal size which prevents discharge into the external circulation. The amount of seed crystals introduced from a seeding stage is great enough that the crystal formation effected thereby in conjunction with the further crystal growth of the already present coarser crystallizate ensures a reduction in the oversaturation of the solution brought about by solvent evaporation, before uncontrolled, spontaneous seed generation can occur as a result of the metastable range being exceeded.

The presence of adequately strong seed generation in the crystallization space may be monitored in accordance with an embodiment of the invention by virtue of the fact a measured value is determined which is representative of the particle size distribution in the crystallization space. For this purpose, the change over time of a relative quantity proportion of a specified segment from the particle size distribution is observed and in the event of a change the quantity of seed crystals introduced is adapted accordingly. When operating conditions are otherwise constant, this quantity should also remain practically constant just like the particle size distribution in the product crystallizate. The representative measured value of the particle size distribution can be determined continuously or even at time intervals, wherein the slower and smaller the changes which occur in the operating conditions, the greater the intervals can be.

A section of the particle size spectrum of the crystallizate which is to be allocated to the region of the fine crystallizate may be selected for the representative measured value of the particle size distribution. The quantity proportion of a particle size range spanning from 0.10 to 1.0 mm, in particular 0.5-0.8 mm may be observed. This measured value can be determined by means of a measuring sensor which is disposed in the crystallization space and which operates, e.g., in accordance with the principle of optical back reflection measurement. In the event of a decrease in the quantity proportion of the observed fine crystallizate segment with respect to a specified desired value, the tendency would be to increase the introduced seed quantity and in the event of a corresponding increase the tendency would be to reduce it. Conversely, in the event of an inadmissible increase in an observed particle size segment which comes from the middle or upper range of the particle size distribution, the introduced seed quantity would be increased and in the event of a decrease in the quantity proportion of this segment it would be reduced.

The required seed crystals for introduction into the crystallization stage may be produced as a seed suspension in a seed generation stage which operates in terms of a flash crystallization by the atomization and decompression of a heated solution of the substance with partial evaporation of the solvent and collection of the thus formed seed crystals and very fine crystallizate in the non-evaporated part of the injected solution. This requires only a small amount of system and operational outlay, as the quantities required are small in comparison with the quantities circulated in the crystallization stage and the apparatuses used can be correspondingly small. The energy expenditure for the operation of flash crystallization may be very low, especially if the heated solution for the seed generation stage is taken from the crystallization stage, in particular from the external circuit. In doing so, an excess of seed suspension from the seed generation stage may be guided back into the external circuit of the crystallization stage and at this location to combine it with the clarified solution before the clarified solution is heated for the dissolution of solids. The vapours of the seed generation stage may be condensed in order to be able to use the condensate inside the process (e.g., for thinning the solvent) or outside the process.

An embodiment of the invention provides a crystallization stage which operates in accordance with the DTB (Draft Tube Baffled) principle. However, it can fundamentally also be applied in a crystallization stage operating in accordance with the Oslo principle. With regard to the present invention, the circulation of the solution or suspension in the crystal fluidized bed of an Oslo crystallizer corresponds to the circulation in the internal solution circuit having an internal circulation pump and a flow guide tube of a DTB crystallizer; the external solvent circuit having an external circulation pump and dissolution of solids by heating can be found in both cases in essentially the same form.

The seed crystals from the seed generation stage may be fed in at a location in the crystallization space where the fine crystals have a comparatively good chance of surviving and growing, i.e. where possible not in proximity to the clarification zone, from which clarified solution for heating and dissolution of solids is drawn off into the external circuit of the solution, but rather into the lower region of the crystallization space, in which the crystallizate bed is located.

With regard to effective and economical energy usage, the evaporation of the solvent may be performed in the crystallization stage at negative pressure and to heat the clarified solution in the external circuit by indirect heat exchange with the vapours from the crystallization stage which have been brought to a higher temperature level by means of vapour compression.

Instead of heating the solution in the external solution circuit by indirect heat exchange, provision could also be made to feed the fresh solution for the crystallization from the outside not as a complete solution but rather by the separate addition of reactants which form the solution initially by means of an exothermic reaction within this process, and moreover within the external solution circuit. This is possible, e.g., for ammonia and concentrated sulphuric acid to form ammonium sulphate solution. In such a case, a direct heat exchange takes place between the media which can render indirect heating superfluous and thus can once again considerably reduce the operational outlay for the process.

These and other objects, advantages and features of this invention will become apparent upon review of the following specification in conjunction with the drawings.

BRIEF DESCRIPTION OF THE DRAWINGS

The invention will be described in detail hereinafter with reference to the exemplified embodiments, illustrated schematically in the Figures, of a system for carrying out the method in accordance with the invention. In the drawings.

DESCRIPTION OF THE PREFERRED EMBODIMENT

Figure 1:
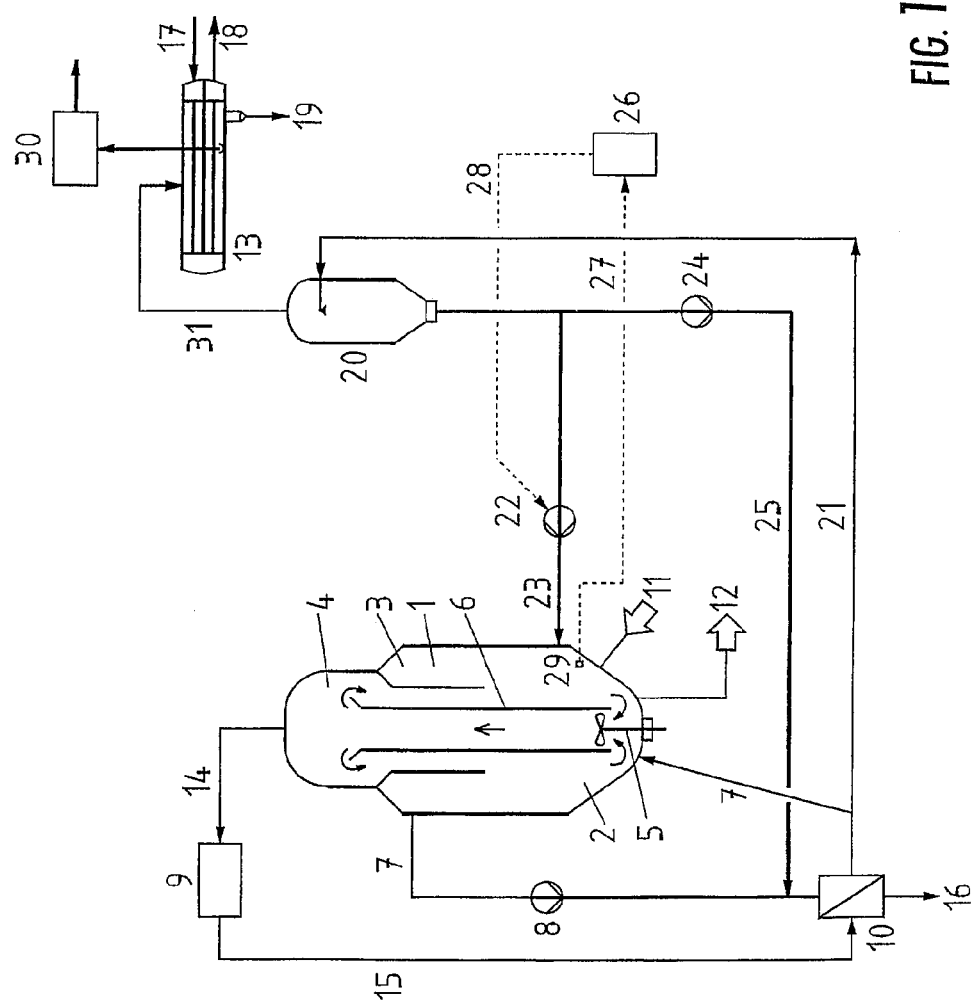
FIG. 1 shows a crystallization system with a DTB crystallizer.

Referring now specifically to the drawings, and the illustrative embodiments depicted therein, the core of a crystallizer system 1 is illustrated in FIG. 1 as a DTB crystallizer, whose head is designated by the reference numeral 4 and whose base region is designated by the reference numeral 2. A flow guide tube 6 is disposed in the interior of the crystallizer 1 in a coaxial manner with respect to the substantially cylindrical periphery of the crystallizer housing. When the system is operating, the liquid level, not shown, is in the region of the upper end of the flow guide tube 6, on the lower end of which there is disposed a circulation pump 5 for an internal solution or suspension circuit. The circulation pump 5, whose drive may be flange-mounted externally to the base of the crystallizer 1, is designed in such a manner that it introduces as little mechanical energy as possible into the suspension, i.e., conveys it in a particularly gentle manner, and consequently only a small degree of abrasion and particle fracture occur in the crystallizate. In this respect, the development of fine solids is reduced.

Provided in an upper region of the crystallizer 1 is a flow guiding wall which terminates below the liquid level, forms an annular chamber open at the bottom and is decoupled in the sense of a clarification region 3 as a flow-calmed space from the internal suspension circuit. Of course, this annular clarification chamber can also be divided by radial separating walls into several partial chambers or can be formed differently.

Leading out from the clarification region 3 is a line 7 of an external solution circuit which is provided with an external circulation pump 8 and leads in the vicinity of the lower end of the flow guide tube 6 into the base region 2 of the crystallizer 1. In the direction of flow downstream of the circulation pump 8, an indirect heat exchanger 10 for heating the solution and for dissolution of solids is incorporated into the line 7. A suspension extraction line 12 is provided in the base region 2 of the crystallizer 1.

Further devices for processing the solution in a manner known, per se, are not illustrated, i.e. there are no devices illustrated for separating the solution from the product crystallizate, for washing and drying and optionally also for screening the product crystallizate.

Connected to the head 4 of the crystallizer 1 is a vapour discharge line 14 which leads to a vapour compressor 9. The vapours which are heated by compression can be guided by a vapour line 15 as a heating medium into the indirect heat exchanger 10 and can then be discharged after heat dissipation and condensation by a condensate discharge line 16. Fresh solution can be supplied to the crystallizer 1 by a solution supply line 11 in the base region 2. Downstream of the heat exchanger 10, a solution line 21 branches off from the line 7 of the external circuit. By means of this solution line 21, heated solution can be supplied to a seed generator 20 which is formed preferably as a flash crystallizer. In the flash crystallizer which may be operated at negative pressure, the heated solution is atomized with decompression, wherein a large portion of the solvent is evaporated and seed crystals and a fine crystallizate are formed which collect in the lower part of the seed generator 20 in the remaining, non-evaporated solution as a seed suspension. With regard to the particle size distribution in the seed suspension in the case of different example substances, the following D50 values can be viewed as expedient:

| | |
|---|---|
| Ammonium sulphate | 0.04-0.05 mm |
| Potassium sulphate | 0.035-0.045 mm |
| Adipic acid | ca. 0.02 mm |

Seed suspension can be fed into the lower part of the crystallizer 1 by a seed crystal line 23 which issues from the base region of the seed generator and into which a pump formed preferably as a metering pump, in particular as a hose pump 22, is incorporated. In an expedient manner, a return line 25 is provided with a pump 24, by means of which excess seed suspension can be guided back into the external circuit, and moreover by reason of the desired dissolution of solids and heating upstream of the heat exchanger. In order to collect and optionally to be able to use the vapours released during atomization of the solution in the seed generator 20, the vapours can be supplied by a vapour discharge line 31 to a condenser 13. The coolant (e.g., water) which is used for cooling the condenser 13 can be supplied by a coolant supply line 17 to the condenser 13 and can then be discharged in a heated state via a coolant discharge line 18. The condenser 13 is connected to a vacuum generation system 30, so the solvent can be evaporated in the flash crystallizer by vacuum evaporation. The condensate formed can be used further by a condensate discharge line 19 as required, e.g., for solvent thinning (not shown).

In order to be able to feed a quantity of seed crystals that is always correct for achieving the desired effect of a constant particle size distribution in the product crystallizate, into the crystallizer 1, regulating electronics 26 are provided. Electronics 26 receive a signal that is representative of the current particle size distribution within the suspension in the crystallizer 1. Electronics 26 receive the signal in a continuous manner or at specific time intervals via a signal line 27, illustrated by a dashed line, of a sensor device 29, whose measuring sensor may be disposed within the crystallization space of the crystallizer 1. Depending upon the change in this signal, the regulating electronics 26 control the hose pump 22 in the manner already described via a signal line 28, also illustrated by a dashed line, and thus ensure the presence of a quantity of seed crystals which is not too great for the desired constant particle size distribution and is always sufficient to safely avoid spontaneous seed generation inside the crystallization space of the crystallizer 1.

Figure 2:
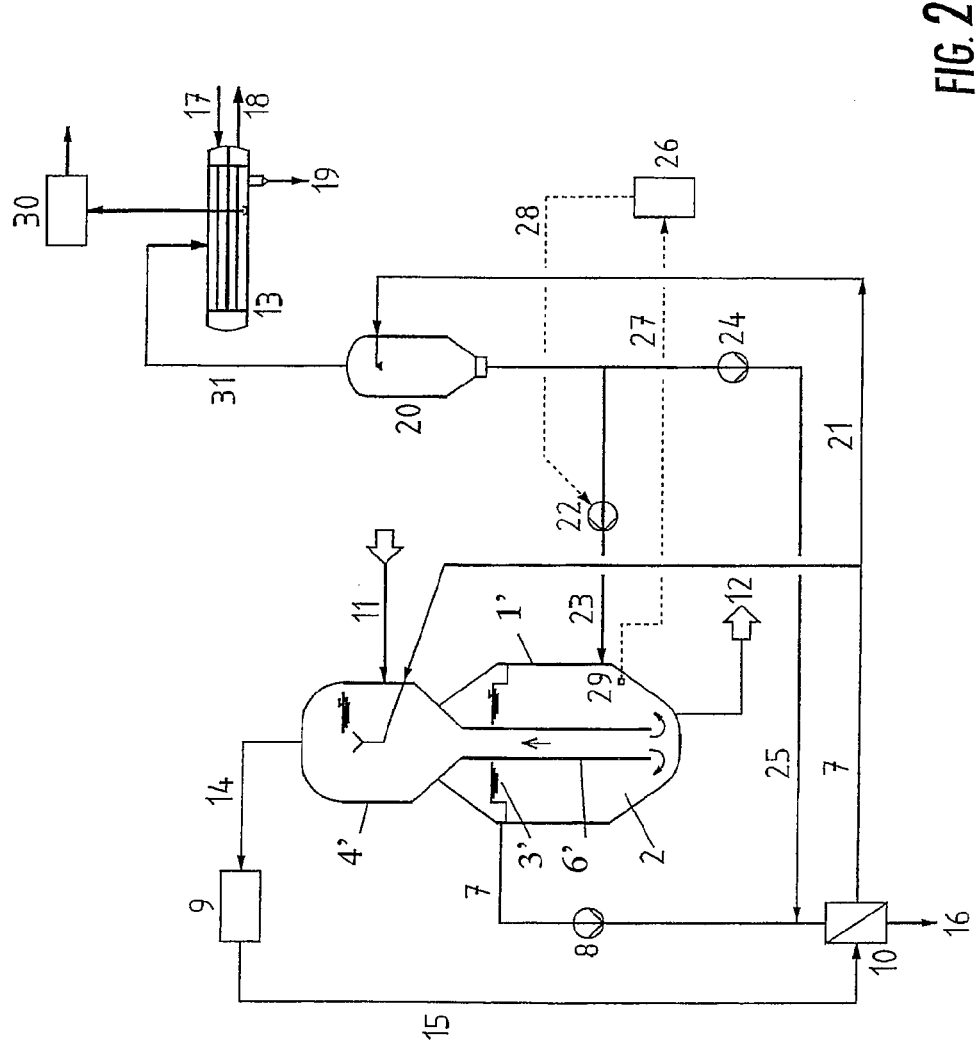
FIG. 2 shows a crystallization system with an Oslo crystallizer.

FIG. 2 illustrates an inventive crystallization system 1' having an Oslo crystallizer, wherein like parts in terms of function are designated by like reference numerals as in FIG.

1, so that in this respect reference is made to the previous description and differences will only be discussed in brief hereinafter.

During operation, the crystallizer 1' has in its lower part a crystal fluidized bed which is kept in motion (internal circulation) by the influx (see arrows) of oversaturated solution, which is effected by reason of the geodetic height difference, from the upper part of the crystallizer 1' through the flow guide tube 6' into the lower part of the crystallizer 1 during continuous crystallization. As in the example of FIG. 1, clarified solution with the proportion of fine crystallizate contained therein is drawn off from the clarification region 3' by the line 7 of the external circuit, but after heating it is then supplied as a solids-free solution to the region of the head 4' of the crystallizer 1' and not to the base region 2 thereof. In the head 4', the solvent is evaporated without any previous conveyance by an internal circulation pump, so that the solution becomes oversaturated in the metastable range in the manner already described.

The application of the invention results, both in the case of the DTB crystallizer and Oslo crystallizer, in the production of coarse-particle crystallizate with a constant particle size distribution.

Changes and modifications in the specifically described embodiments can be carried out without departing from the principles of the invention which is intended to be limited only by the scope of the appended claims, as interpreted according to the principles of patent law including the doctrine of equivalents.

| List of reference numerals | |
|---|---|
| 1 | crystallizer |
| 2 | base region |
| 3 | clarification region |
| 4 | head of the crystallizer |
| 5 | internal circulation pump |
| 6 | flow guide tube |
| 7 | line of the external circuit |
| 8 | external circulation pump |
| 9 | vapour compressor |
| 10 | heat exchanger |
| 11 | solution supply line |
| 12 | suspension extraction line |
| 13 | condenser |
| 14 | vapour discharge line |
| 15 | vapour line |
| 16 | condensate discharge line |
| 17 | coolant supply line |
| 18 | coolant discharge line |
| 19 | condensate discharge line |
| 20 | seed generator |
| 21 | solution line |
| 22 | hose pump |
| 23 | seed crystal line |
| 24 | pump |
| 25 | return line |
| 26 | regulating electronics |
| 27 | signal line |
| 28 | signal line |
| 29 | sensor device |
| 30 | vacuum generator |
| 31 | vapour discharge line |

The invention claimed is:

1. Method for continuously producing a product crystallizate having a substantially constant particle size distribution by crystallization of a substance from an oversaturated solution of the substance in a solvent in a crystallization stage, wherein a suspension of oversaturated solution and crystallizate formed in the crystallization stage is circulated internally, wherein the oversaturation of the solution is produced by evaporation of the solvent in the crystallization stage and the vapour thus formed is drawn off from the crystallization stage, wherein a partial flow of a clarified solution from a clarification region of the crystallization stage having a solids proportion comprising seed crystals and fine crystals is drawn off, is heated in an external circuit and, after dissolution of the solids proportion, is then guided as a solution back into the crystallization stage and wherein the crystallization stage is continuously supplied with fresh solution and a crystal suspension, said method comprising:

metering an amount of crystal suspension in dependence upon a measured value which is determined directly or indirectly in a continuous manner or at time intervals and is representative of the particle size distribution in the suspension of the crystallization stage, said measured value being representative of the relative quantity proportion of a specified segment from the particle size distribution of the suspension in a segment from a fine crystallizate region of the particle size distribution;

continuously drawing off a product suspension having the proportion of product crystallizate contained therein at the desired particle size from the base region of the crystallization stage;

continuously feeding the crystal suspension from a seed generation stage as a seed suspension comprising seed crystals and fine crystallizate of the substance having an average particle size of less than approximately 0.1 mm into the internally circulated suspension, generally increasing the quantity of seed suspension fed in response to a decrease in the quantity proportion of the segment from the fine crystallizate region with respect to a specified desired value, and generally reducing the quantity of seed suspension fed in response to an increase in the quantity proportion of the segment from the fine crystallizate region with respect to the specified desired value; and obtaining the seed suspension in the seed generation stage as a flash crystallization by the atomization and decompression of a heated solution of the substance with partial evaporation of the solvent and collection of seed crystals thus formed and fine crystallizate in the non-evaporated part of the injected solution.

2. The method as claimed in claim 1 including determining particle size distribution by an electronic measurement in the crystallization stage.

3. The method as claimed in claim 1 wherein the segment from the fine crystallizate region represents the quantity proportion of a particle size range spanning from about 0.5 to 1.5 mm.

4. The method as claimed in claim 3 wherein the segment from the fine crystallizate region represents the quantity proportion of a particle size range spanning from about 0.5 to 0.8 mm.

5. The method as claimed in claim 1 including taking the heated solution for the seed generation stage from the crystallization stage.

6. The method as claimed in claim 5 including taking the heated solution for the seed generation stage from the external solution circuit.

7. The method as claimed in claim 1 including guiding an excess of seed suspension from the seed generation stage into the external solution circuit and combining the excess of seed suspension at this location with the clarified solution, before the clarified solution is heated for the dissolution of solids.

8. The method as claimed in claim 1 including condensing the vapours of the seed generation stage.

9. The method as claimed in claim 1 including operating the crystallization stage in accordance with a draft tube baffled principle.

10. The method as claimed in claim 1 including evaporating the solvent in the crystallization stage at negative pressure.

11. The method as claimed in claim 1 including heating the clarified solution in the external solution circuit by indirect heat exchange using vapours from the crystallization stage which are brought to a higher temperature level by vapour compression.

12. A system for continuously producing a product crystallizate having a substantially constant particle size distribution by crystallization of a substance from an oversaturated solution of the substance in a solvent in a crystallization stage, said system comprising:
- a crystallizer having a head, a base region and a clarification region;
- an internal suspension circulation, a solution supply line for introducing fresh solution to said crystallizer and a vapour line to said head;
- a line comprising a circulation pump and a heating device, said line defining an external circuit for extracting clarified solution from said clarification region of the crystallizer and for guiding substantially solids-free solution back into said base region of the crystallizer;
- said base region being connected to a suspension extraction line defining a seed generator from which seed crystals can be fed into the crystallizer via a seed crystal line;
- a measuring device that produces a measured value that is directly or indirectly representative of the particle size distribution in the suspension in the crystallizer, the measured value being representative of the relative quantity proportion of a specified segment from the particle size distribution of the suspension in a segment from the fine crystallizate region of the particle size distribution;
- said seed generator comprising a flash crystallizer for the generation of a seed suspension comprising seed crystals and fine crystallizate of the substance having an average particle size of less than approximately 0.1 mm, and a control responsive to the measured value for regulating the quantity of seed crystals to be fed continuously into the crystallizer with regard to a particle size distribution of the crystallizate in the suspension extraction line that remains approximately constant, wherein the quantity of seed suspension fed is generally increased in the event of a decrease in the quantity proportion of the segment from the fine crystallizate region with respect to a specified desired value and the quantity of seed suspension fed is generally decreased in the event of an increase in the quantity proportion of the segment from the fine crystallizate region with respect to the desired value.

13. The system as claimed in claim 12 wherein said crystallizer comprises a draft tube baffled crystallizer.

14. The system as claimed in claim 12 wherein said measuring device comprises an electronic sensor system.

15. The system as claimed in claim 14 wherein said sensor system is disposed in said crystallization space of said crystallizer.

16. The system as claimed in claim 14 wherein said sensor system comprises at least one sensor that utilizes optical back reflection.

17. The system as claimed in claim 12 wherein said heating device in said external circuit comprises an indirect heat exchanger.

18. The system as claimed in claim 12 including a solution line that supplies part of the solution from said crystallizer to said seed generator.

19. The system as claimed in claim 18 wherein said solution line branches off of said external circuit.

20. The system as claimed in claim 19 wherein said solution line branches off of said external circuit downstream of said heating device.

21. The system as claimed in claim 12 including a vapour discharge line connecting said seed generator to a condenser.

22. The system as claimed in claim 21 wherein said condenser is connected to a vacuum generator.

23. The system as claimed in claim 12 wherein said seed crystal line is guided out of said seed generator into a lower portion of said crystallizer.

24. The system as claimed in claim 12 including a return line for feeding excess seed suspension from said seed generator upstream of said heating device into said line of said external circuit.

25. The system as claimed in claim 17 wherein said vapour line is guided to a vapour compressor for guiding vapours heated by compression as a heating medium to said heat exchanger.

26. The system as claimed in claim 12 including a metering pump incorporated into said seed crystal line.

27. The system as claimed in claim 26 wherein said metering pump comprises a hose pump.

* * * * *